United States Patent
Schulz et al.

(10) Patent No.: US 10,186,827 B2
(45) Date of Patent: Jan. 22, 2019

(54) AMPLIFYING PULSED LASER RADIATION FOR EUV RADIATION PRODUCTION

(71) Applicant: TRUMPF Lasersystems for Semiconductor Manufacturing GmbH, Ditzingen (DE)

(72) Inventors: Joachim Schulz, Gerlingen (DE); Guenther Krauss, Ditzingen (DE); Matthias Wissert, Stuttgart (DE)

(73) Assignee: TRUMPF Lasersystems for Semiconductor Manufacturing GmbH, Ditzingen (DE)

( * ) Notice: Subject to any disclaimer, the term of this patent is extended or adjusted under 35 U.S.C. 154(b) by 119 days.

(21) Appl. No.: 15/402,368

(22) Filed: Jan. 10, 2017

(65) Prior Publication Data
US 2017/0149202 A1    May 25, 2017

Related U.S. Application Data

(63) Continuation of application No. PCT/EP2014/064958, filed on Jul. 11, 2014.

(51) Int. Cl.
| | | |
|---|---|---|
| H01S 3/10 | (2006.01) | |
| H01S 3/223 | (2006.01) | |
| H01S 3/23 | (2006.01) | |
| H05G 2/00 | (2006.01) | |
| H01S 3/00 | (2006.01) | |

(52) U.S. Cl.
CPC ........ H01S 3/10038 (2013.01); H01S 3/1003 (2013.01); H01S 3/10015 (2013.01);
(Continued)

(58) Field of Classification Search
CPC ........ H05G 2/003; H05G 2/005; H05G 2/008; H01S 3/0064; H01S 3/2232; H01S 3/2308
See application file for complete search history.

(56) References Cited

U.S. PATENT DOCUMENTS

| | | | | |
|---|---|---|---|---|
| 5,452,313 A | * | 9/1995 | Fink | ............ H01S 3/0064 359/287 |
| 2006/0192152 A1 | | 8/2006 | Ershov et al. | |

(Continued)

FOREIGN PATENT DOCUMENTS

| | | |
|---|---|---|
| DE | 4127407 A1 | 2/1993 |
| EP | 0674374 A2 | 9/1995 |
| EP | 0674375 | 9/1995 |
| WO | WO 2011/162903 | 12/2011 |

(Continued)

OTHER PUBLICATIONS

International Search Report from corresponding PCT Application No. PCT/EP2014/064958, dated Mar. 18, 2015, 4 pages.

(Continued)

*Primary Examiner* — David E Smith
*Assistant Examiner* — Hsien Tsai
(74) *Attorney, Agent, or Firm* — Fish & Richardson P.C.

(57) ABSTRACT

Systems, methods, and apparatus, including non-transitory computer-readable storage medium, for amplifying pulsed laser radiation in an EUV laser driver are provided. An example EUV laser driver includes a beam source configured to produce the pulsed laser radiation with at least one laser frequency, an amplifier arrangement with at least one optical amplifier for amplifying the pulsed laser radiation, the at least one optical amplifier having a frequency-dependent gain with a maximum gain at a maximum frequency, at least one frequency shifter configured to produce a frequency shift for the laser frequency of the pulsed laser radiation relative to the maximum frequency, and a controller configured to set the frequency shift such that a gain of the at least one optical amplifier for the pulsed laser radiation is reduced to less than a percentage, e.g., 90%, 70%, or 50%, of the maximum gain.

20 Claims, 2 Drawing Sheets

(52) U.S. Cl.
CPC .......... *H01S 3/2232* (2013.01); *H01S 3/2316* (2013.01); *H05G 2/008* (2013.01); *H01S 3/0078* (2013.01); *H01S 3/2391* (2013.01)

(56) References Cited

U.S. PATENT DOCUMENTS

| | | |
|---|---|---|
| 2008/0149862 A1 | 6/2008 | Hansson et al. |
| 2009/0095925 A1 | 4/2009 | Ershov et al. |
| 2011/0192995 A1* | 8/2011 | Ershov .................. H05G 2/003 250/504 R |

FOREIGN PATENT DOCUMENTS

| | | |
|---|---|---|
| WO | WO 2012/073087 | 6/2012 |
| WO | WO 2013/104947 | 7/2013 |
| WO | WO2011162093 A1 | 8/2013 |
| WO | WO 2016/005006 | 1/2016 |

OTHER PUBLICATIONS

Notification of Transmittal of translation of the International Preliminary Report on Patentability and the Written Opinion of the International Search Authority for corresponding PCT Application No. PCT/EP2014/064958, dated Jan. 26, 2017, 15 pages.

International Preliminary Report on Patentability in International application No. PCT/EP2015/077873, dated Jun. 7, 2018, 13 pages (with English translation).

International Search Report and Written Opinion in International Application No. PCT/EP2015/077873, dated Jul. 28, 2016, 14 pages (with English translation).

\* cited by examiner

Fig. 3

AMPLIFYING PULSED LASER RADIATION FOR EUV RADIATION PRODUCTION

CROSS-REFERENCE TO RELATED APPLICATION

This application is a continuation and claims priority under 35 U.S.C. § 120 to PCT Application No. PCT/EP2014/064958, filed on Jul. 11, 2014. The contents of this priority application is incorporated herein by reference in its entirety.

TECHNICAL FIELD

The present invention relates to systems, methods, and apparatus for amplifying pulsed laser radiation, particularly for extreme ultraviolet (EUV) radiation production.

BACKGROUND

By way of example, a driver laser arrangement for an EUV light source was disclosed in US 2009/0095925 A1. The driver laser arrangement described therein comprises a beam source for generating pulsed laser radiation and one or more optical amplifiers for amplifying the pulsed laser radiation. The beam source of the driver laser arrangement serves to produce so-called seed pulses, which are amplified in the optical amplifier or amplifiers to high laser powers of several kW, possibly of 10 kW or more. The laser radiation amplified by the driver laser arrangement is fed via a beam guiding device to a focusing device, which focuses the laser radiation or the laser beam in a target region. A target material which transitions into a plasma phase when irradiated by the laser beam and emits EUV radiation in the process is provided in the target region.

In the driver laser arrangement described above, a pre-pulse and, following in succession after a short period of time, a main pulse are typically produced by the beam source and focused on the target region with the target material. The pre-pulse is intended to serve to influence the target material, for example to heat, expand, vaporize or ionize the latter and/or to produce a weak, or possibly a strong, plasma. The main pulse is intended to serve to convert the majority of the material influenced by the pre-pulse into the plasma phase and generate EUV radiation in the process. The pre-pulse typically has significantly lower laser power than the main pulse. The same laser wavelength is used for the pre-pulse and the main pulse in the driver laser arrangement from US 2009/0095925 A1. However, it is also possible to use different wavelengths for the pre-pulse and the main pulse, as described in WO 2011/162903 A1, in which a seed laser is used to produce the pre-pulse and a further seed laser with a different wavelength is used to produce the main pulse, which pulses are combined by means of a beam combiner in order to pass along a common beam path through one or more amplifiers and the beam guiding device following the driver laser arrangement.

In the driver laser arrangement described above, there can be a reflection of the amplified laser radiation, for example, at the target material, which may, e.g., be present in the form of tin droplets. The back-reflection produced at such a droplet returns into the optical amplifier or amplifiers and passes through the gain medium present there, and so the back-reflection is also amplified in the optical amplifier or amplifiers. Even a weak back-reflection may be sufficient to generate power after amplification in the gain medium of the optical amplifier that can damage the optical or possibly mechanical components in the optical amplifier or in the beam path upstream of the optical amplifier.

In order to suppress back-reflected laser radiation, it is known to use so-called optical isolators, which only let laser radiation pass in one direction and which are also referred to as optical diodes on account of this property. Such optical isolators can be arranged between a beam source and an optical amplifier or else between two optical amplifiers. By way of example, DE 41 27 407 A1 discloses the practice of respectively applying one optical diode between an injection seeding laser and a resonator and between a resonator and an amplifier.

In the driver laser arrangement described above, high laser powers of 500 W and more, of 1 kW and more and even of 10 kW and more can be produced during amplification. A problem in the case of such high laser powers is that the optical components used in conventional optical isolators may cause strong thermally-induced aberrations, in particular astigmatism, and moreover may possibly be damaged by the laser radiation. Moreover, there is a problem in that optical isolators generally are unable to completely suppress laser radiation propagating in the undesired direction, and so the non-suppressed power component in the case of high laser powers is so large despite the use of optical isolators that returning laser radiation is produced, possibly even though an optical isolator is used. Compounding this in the current application is that optical diodes based on the principle of the polarizer or phase shifter can only suppress laser radiation with a specific phase jump or with a specific phase shift (e.g., 180°) for design reasons. The value for this phase jump or for this phase shift may not be met in the case of reflection at a droplet, and so the laser radiation reflected at the droplet cannot be completely suppressed by the optical diode for this reason either.

SUMMARY

The present invention is directed to a driver laser arrangement for an EUV radiation production apparatus (e.g., an EUV laser driver), an EUV radiation production apparatus (e.g., an EUV radiation source), and a method for amplifying laser radiation, in which returning laser radiation is effectively suppressed.

One aspect of the present invention features an EUV laser driver comprising: a beam source configured to produce pulsed laser radiation with at least one laser frequency, an amplifier arrangement with at least one optical amplifier for amplifying the pulsed laser radiation, at least one frequency shifting device (e.g., a frequency shifter) configured to produce a frequency shift of the laser frequency of the laser radiation relative to a maximum frequency of the at least one optical amplifier, the at least one optical amplifier having a frequency-dependent gain with a maximum gain at the maximum frequency, and a controlling device (e.g., a controller) configured to be embodied or programmed to set the frequency shift in such a way that the frequency-dependent gain of the optical amplifier for the laser radiation, to be precise for the power of the laser radiation, is reduced to less than 90%, preferably to less than 70%, particularly preferably to less than 50%, of a maximum gain of the optical amplifier.

If a plurality of optical amplifiers is connected in series in the EUV laser driver, the gain of at least one of the optical amplifiers is reduced to less than 90%, less than 70% or less than 50% of the maximum gain of the optical amplifier.

Within the meaning of this application, the term "gain" of an optical amplifier is understood to mean the so-called small-signal gain, more precisely the gain coefficient of the small-signal gain. No saturation effects are taken into account in the small-signal gain. Optical amplifiers have a frequency-dependent small-signal gain or a frequency-dependent gain profile which may substantially correspond to a Lorentzian profile in the case of, e.g., a $CO_2$ gas laser or amplifier. The gain profile has a maximum $V_{MAX}$ of the (small-signal) gain at a maximum frequency $f_M$. According to laser theory, the following applies to the (un-normalized) maximum gain $V_{MAX}$, i.e., to the gain coefficient of the small-signal gain:

$$V_{MAX}=c^2/(8\pi f_M^2 \Delta B)(N_2-N_1)1/\tau_{sp},$$

where $\Delta B$ denotes a full width at half maximum or amplifier bandwidth of the frequency-dependent amplifier profile, $N_2$ and $N_1$ denote the occupancy density of the upper and lower energy levels, respectively, and $\tau_{sp}$ denotes the mean lifetime in the upper energy level. The (small-signal) gain $V_{MAX}$ has units of 1/length, e.g., $cm^{-1}$.

The intensity $I(x)$ of the laser radiation entering the amplifier with the frequency $f_M$ and the intensity $I_0$ along the amplifier path x is given by the equation $I(x)=I_0 \exp(V_{MAX}x)$ if saturation is not taken into account.

In principle, optical amplifiers should amplify the entering laser radiation with the maximum possible gain. Therefore, the laser frequency of the laser radiation radiated into the optical amplifier generally corresponds to the maximum frequency $f_M$ of the optical amplifier. In the use described here of one or more optical amplifiers in a driver laser arrangement, it was found to be advantageous if the gain for the laser radiation is reduced in relation to the maximum possible gain, at least for a first pulse, i.e., the so-called pre-pulse. The pre-pulse and the main pulse following the former are radiated in succession with a brief time interval therebetween onto the target material. The two pulses pass collinearly, but with a slight time offset, through at least one optical amplifier. The pre-pulse should have a lower power in relation to the main pulse. In order to reduce the laser power of the first pulse, the laser power of the beam source is reduced when producing the pre-pulse in known solutions.

Instead of reducing the laser power of the first pulse prior to reaching the at least one optical amplifier, it is proposed, according to the invention, to produce the reduction of the power of the first pulse in the optical amplifier or amplifiers. This is advantageous because, as presented above, part of the laser radiation of the first pulse is reflected back at the target material into the beam path which passes through the optical amplifier or amplifiers, possibly amplified to damaging power and coupled back into the beam source. The back-reflection or the back-reflected component of the laser radiation of the first pulse is amplified in the optical amplifiers by means of the currently available gain. Amplification of the returning laser radiation is problematic, particularly in the case of the pre-pulse, to the extent that the laser power of the beam source coupled into the optical amplifier is reduced, as is the case in the known solutions. As a result of the low power of the coupled-in laser radiation, very much "power" or a high occupancy inversion is still present in the gain medium in this case, which is used by the back-reflection of the pre-pulse when passing back through the optical amplifier, and said back-reflection experiences a significant gain.

The main pulse passes through the optical amplifier or amplifiers only after the back-reflection of the pre-pulse. A majority of the power available in the optical amplifier or amplifiers is used when amplifying the main pulse, and so the back-reflection of the main pulse only experiences comparatively low gain in the optical amplifiers.

By reducing the gain of the first pulse in the optical amplifier or amplifiers, the gain of the part of the first pulse back-reflected at the target material is reduced to a corresponding extent, and so the power of the back-reflected part of the first pulse is smaller when passing back through the amplifier arrangement. Due to the reduced laser power of the back-reflection, one or more optical diodes can be arranged, possibly in the beam path between the optical amplifiers or in the beam path upstream of the (first) optical amplifier, in order to suppress the back-reflected portion of the laser radiation. The use of optical diodes for suppressing the laser radiation back-reflected by the target material may otherwise be problematic since optical diodes are susceptible to destruction and only available for low laser powers.

In one embodiment, the beam source is embodied to produce a first pulse and, following the first pulse in time, a second pulse of the pulsed laser radiation, and the control device is embodied to reduce the gain of the optical amplifier for the first pulse to less than 90%, preferably to less than 70%, particularly preferably to less than 50%, of the maximum (small-signal) gain of the optical amplifier for the first pulse. As described above, the first pulse should have lower energy than the second pulse at the end of the amplification. Due to the problem of the back-reflection, it is advantageous if the lower power or energy of the first pulse is brought about by reducing the gain of the first pulse in the at least one optical amplifier. The gain can be reduced in a single optical amplifier of the amplifier arrangement; however, it may be more advantageous if gain is reduced in two or more optical amplifiers of the amplifier arrangement. Due to the reduced gain of the back-reflection, it was found to be advantageous to reduce the laser power of the amplified first pulse in relation to the laser power of the amplified second pulse by reducing the optical gain of the amplifier arrangement for the first pulse. The control device or the driver laser arrangement can be embodied to amplify the second pulse with the maximum gain, e.g., the laser frequency of the second pulse corresponds to the maximum frequency of the optical amplifier or optical amplifiers.

In some embodiments, the frequency shifting device has at least one acousto-optic modulator. An acousto-optic modulator, which is also referred to as a Bragg cell, renders it possible in a simple manner to shift the frequency of a laser beam. To this end, a grating is generated in a transparent solid, e.g., with the aid of sound waves, with the light beam being diffracted at said grating and the frequency thereof being modified due to the movement of the sound waves generating the lattice. The frequency shift of the laser radiation can correspond to the modulation frequency or the excitation frequency of the sound waves, or be proportional thereto.

In one development, the acousto-optic modulator is embodied for operation with a modulation frequency of at least 40 MHz, preferably of at least 80 MHz. As described above, the modulation frequency can correspond to the frequency shift of the laser radiation (e.g., in the case of diffraction into the $+/-1^{st}$ order of diffraction). As a result of the comparatively broad spectrum of the gain of the optical amplifier, it is advantageous if the frequency shift, and hence the modulation frequency of the acousto-optic modulator, is as large as possible. If a plurality of optical amplifiers is present in the amplifier arrangement, respectively one acousto-optic modulator which produces a frequency shift can be present in the two or more optical amplifiers. In this case, the acousto-optic modulators can be embodied or arranged in such a way that they cause a frequency shift in the same direction, e.g., that the frequency shifts of the individual acousto-optic modulators add. However, such an arrangement may be problematic due to the high laser powers at the output of the amplifier arrangement. It is also possible to arrange one, two or more optical modulators in the beam path upstream of the first optical amplifier. If the beam source has a first laser source for generating the pre-pulse and a second laser source for generating the main pulse, the beam paths of which are combined by the optical amplifier or amplifiers, the at least one acousto-optic modulator can be arranged, in particular, in the beam path of the first laser source.

In a further development, the acousto-optic modulator can be embodied to diffract the laser radiation into at least the second order of diffraction, e.g., the incident laser radiation is diffracted into the ($+2^{nd}$ or $-2^{nd}$) second order of diffraction. In this manner, the frequency shift can be increased for a given modulation frequency.

In a further embodiment, the beam source has a frequency shifting device. In this case, this relates to a beam source, the laser wavelength or laser frequency of which is tunable or switchable. The control device actuates the frequency shifting device so as to bring about a frequency shift between the laser frequency and the maximum frequency of the first pulse in order thus to reduce the power of the first pulse. After producing the first pulse, the control device modifies the laser frequency with the aid of the frequency shifting device such that the beam source produces a second pulse with a laser frequency that corresponds to the maximum frequency of the optical amplifier.

By way of example, an optically parametric oscillator, in which there is a frequency conversion of laser radiation which, e.g., is produced by a solid-state laser, can serve as a frequency shifting device for tuning the laser wavelength of the beam source. Alternatively, it is also possible to produce the laser radiation using two different laser frequencies or laser wavelengths in the beam source. By way of example, a $CO_2$ laser source can serve to produce the main pulse at a laser wavelength of 10.6 µm, and can possibly use a different line in the absorption spectrum of the $CO_2$ laser gas, for example a line lying at a wavelength in the region between 10.1 µm and 10.35 µm, for producing the pre-pulse. Optionally, it is also possible for two laser sources to be provided in the beam source, which laser sources produce laser radiation at different laser wavelengths, for example a first $CO_2$ laser source with a wavelength of 10.6 µm and a second $CO_2$ laser source with a wavelength in the specified range between 10.1 µm and 10.35 µm. In this case, the frequency shifting device can also be a switching device which, for the purposes of producing the pre-pulse or the main pulse, brings about the excitation of different laser lines in the absorption spectrum or, for the purposes of producing the pre-pulse and the main pulse, switches between two different laser sources (with a fixed laser frequency), of which one, the laser frequency of which not corresponding to the maximum frequency, serves as the frequency shifting device. In particular, when two laser sources are used, the frequency shifting devices, for example in the form of the acousto-optic modulators, can be arranged in the beam path of that laser source which produces the pre-pulse such that the laser frequency of the laser radiation which is emitted by the laser source producing the main pulse does not experience a frequency shift.

In a further embodiment, the optical amplifier has a (small-signal) gain with an amplifier bandwidth of 400 MHz or more for the laser radiation. Here, the small-signal amplifier bandwidth is understood to mean that bandwidth in which the maximum (power) gain of the optical amplifier has fallen to 50% ("full width half maximum"). If the optical amplifier serves to amplify laser radiation of a laser source embodied as a $CO_2$ laser, it can, for example, comprise $CO_2$ as laser gas. The amplifier bandwidth of the optical amplifier depends on the temperature, the pressure, and the composition of the laser gas. For the present application, the assumption can be made that these parameters are known. The bandwidth of the laser radiation emitted by a beam source, e.g., a $CO_2$ laser, has a significantly smaller band or line width, which is predetermined by the laser resonator, and so a reduction in the gain can be produced by a frequency shift.

Another aspect of the invention features an EUV radiation source, comprising: an EUV laser driver as described above, a vacuum chamber in which a target material is arrangeable at a target position, and a beam guiding device (e.g., a beam guider) configured to guide the pulsed laser radiation from the EUV laser driver toward the target position, such that, when irradiated by the pulsed laser radiation, the target material is converted into a plasma phase to emit EUV radiation. As described above, a pre-pulse with a lower laser power and, shortly thereafter in time, a main pulse with a higher laser power are guided to the target material, for example in the form of tin droplets, in order to change it into a plasma phase.

In some embodiments, the EUV radiation source further comprises a focusing lens configured to focus the pulsed laser radiation onto the target material at the target position and a collector mirror configured to focus the EUV radiation emitted from the target position. The collector mirror can comprise an opening for passage of the pulsed laser radiation, and the focusing lens can separate the vacuum chamber from the beam guiding device.

A further aspect of the invention features a method of amplifying pulsed laser radiation in an EUV laser driver comprising: amplifying the pulsed laser radiation in at least one optical amplifier, where a frequency shift of a laser frequency of the laser radiation is produced in relation to a maximum frequency of a frequency-dependent gain of the optical amplifier when amplifying the laser radiation such that the small-signal gain of the optical amplifier for the laser radiation is reduced to less than 90%, preferably to less than 70%, particularly preferably to less than 50%, of a maximum gain of the optical amplifier. In the method, the laser frequency is shifted so far in relation to the maximum frequency of the optical amplifier that the gain of the optical amplifier, associated with the shifted frequency, drops to less than 90% or to less than 70% or optionally to less than 50% of the maximum gain of the optical amplifier.

In one variant of the method, the pulsed laser radiation comprises a first pulse and, following the first pulse in time, a second pulse, where the gain of the first pulse by the optical amplifier lies at less than 90%, preferably at less than 70%, particularly preferably at less than 50%, of the maximum gain of the optical amplifier. As is illustrated above, it is advantageous due to the back-reflection to produce the reduced power of the pre-pulse by reducing the gain of the pre-pulse in the amplifier arrangement. By contrast, the second pulse can be amplified with the maximum gain of the optical amplifier or amplifiers, e.g., the laser frequency of the second pulse can correspond to the maximum frequency of the optical amplifier or amplifiers.

The invention also features another method of amplifying pulsed laser radiation in an EUV laser driver. The method includes: producing, by at least one frequency shifter, a frequency shift for a laser frequency of the pulsed laser radiation relative to a maximum frequency of at least one optical amplifier, the at least one optical amplifier having a frequency-dependent gain with a maximum gain at the maximum frequency; and amplifying, by the at least one optical amplifier, the pulsed laser radiation with the shifted laser frequency, such that a gain of the at least one optical amplifier for the pulsed laser radiation with the shifted laser frequency is reduced to less than a specific percentage of the maximum gain of the at least one optical amplifier. The method can set a modulation frequency for the at least one frequency shifter, and the frequency shift can correspond to the modulation frequency.

In some embodiments, the pulsed laser radiation comprises a first pulse and a second pulse following the first pulse in time. Producing a frequency shift for a laser frequency of the pulsed laser radiation comprises producing the frequency shift for the laser frequency of the first pulse, and a gain of the least optical amplifier for the first pulse is reduced to less than the specific percentage of the maximum gain of the at least one optical amplifier, the specific percentage being 90%, 70%, or 50%.

The invention also features a computer program product comprising codes adapted to execute all steps of the methods as described above when the computer program runs on a data processing system including one or more processors. By way of example, the data processing system can be the controller described further above, which acts on the frequency shifter in a suitable manner.

Further advantages of the invention emerge from the description and the drawing. Likewise, the features, which were mentioned above and which are yet to be listed below, can find use respectively on their own or together in any combination. The shown and described embodiments should not be understood as an exhaustive list but rather have exemplary character for illustrating the invention.

DETAILED DESCRIPTION

In the following description of the drawings, identical reference signs are used for equivalent or functionally equivalent components.

Figure 1A:
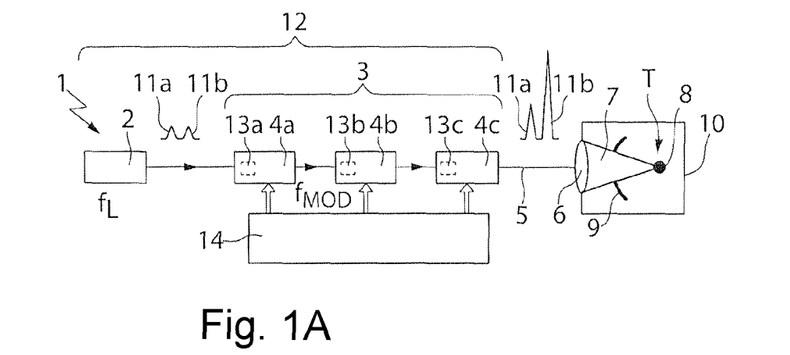
FIGS. 1A, 1B and 1C show schematic illustrations of three exemplary embodiments of an EUV radiation production apparatus with a driver laser arrangement.

FIG. 1A schematically shows an EUV radiation production apparatus 1, which comprises a beam source 2, an amplifier arrangement 3 with three optical amplifiers 4a, 4b, 4c or amplifier stages, a beam guiding device 5 (not depicted in any more detail), and a focusing lens 6. The focusing lens 6 serves to focus the laser radiation 7 (in the form of a pulsed laser beam), which was produced by the beam source 2 and amplified by the amplifier arrangement 3, at a target region or a target position T, at which a target material 8 has been introduced. When irradiated by the laser beam 7, the target material 8 is converted into a plasma phase, which emits EUV radiation in the process. The EUV radiation can be focused by a collector mirror 9.

In the example shown in FIG. 1A, the collector mirror 9 has an opening for the passage of the laser beam 7, and the focusing lens 6 separates a vacuum chamber 10, in which the target material 8 is arranged, from the beam guiding device 5. In the shown example, the beam source 2 comprises a $CO_2$ laser to produce a first pulse 11a (pre-pulse) and, shortly thereafter, a second pulse 11b (main pulse). The first and second pulses are amplified together in the amplifier arrangement 3 and focused onto the target material 8 or into the region of the target position T. Together with the amplifier arrangement 3, the beam source 2 forms a driver laser arrangement 12 of the EUV radiation production apparatus 1.

The wavelength $\lambda_L$ of the laser radiation 7, which is produced by the beam source 2, is constant and lies at approximately 10.6 μm in the shown example of a beam source 2 in the form of a $CO_2$ laser. The known relationship $f=c/\lambda$, where f denotes the frequency, $\lambda$ denotes the wavelength, and c denotes the speed of light in vacuum, applies between the wavelength $\lambda_L$ of the laser radiation 7 and the frequency $f_L$ of the laser radiation 7. The laser wavelength $\lambda_L$ of 10.6 μm corresponds to a laser frequency $f_L$ of approximately 21 THz. As is identifiable in FIG. 1A on the basis of the pulse heights, both pulses 11a, 11b are produced with the same power by the beam source 2 and amplified to a different extent in the three optical amplifiers 4a-c of the amplifier arrangement 3 such that the amplified first pulse 11a has a lower laser power at the output of the amplifier arrangement 3 than the amplified second pulse 11b. The gain of the amplifier arrangement 3 for the first pulse 11a can lie, e.g., at less than 90%, preferably at less than 70%, of the gain of the amplifier arrangement 3 for the second pulse 11b. This is advantageous since the first pulse 11a is intended to impact on the target material 8 with a lower power than the second pulse 11b.

The different gains of the two pulses 11a, 11b in the amplifier arrangement 3 are achieved by virtue of the gain of the first pulse 11a in a respective optical amplifier 4a-c being reduced in relation to the gain of the second pulse 11b in a respective optical amplifier 4a-c. To achieve this, a frequency shifting device, e.g., in the form of an acousto-optic modulator 13a-c, the functionality of which will be described below on the basis of FIG. 2 and FIG. 3, is arranged at each one of the three optical amplifiers 4a-c in the shown example.

Figure 2:
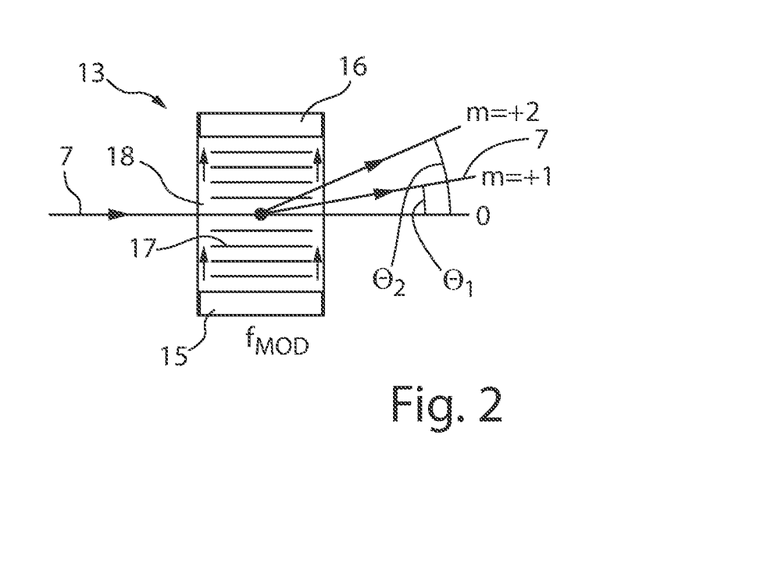
FIG. 2 shows a schematic illustration of an acousto-optic modulator, which is integrated into the driver laser arrangement of FIG. 1A to modify the frequency of the pulsed laser radiation.
Figure 3:
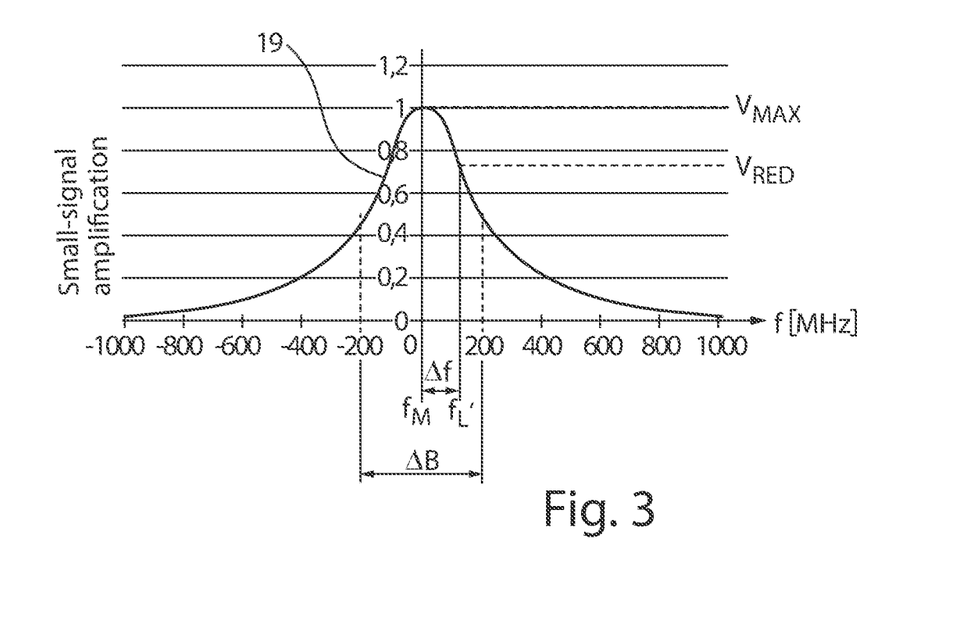
FIG. 3 shows an illustration of the frequency-dependent small-signal gain of one of the optical amplifiers of FIGS. 1A, 1B and 1C.

FIG. 2 shows an acousto-optic modulator 13, which comprises an ultrasound transmitter 15, an ultrasound absorber 16, and a solid-state crystal 18 (e.g., made of Ge). The solid-state crystal 18 is arranged between the ultrasound transmitter 15 and the ultrasound absorber 16 and transparent to the laser wavelength $\lambda_L$. The ultrasound transmitter 15 produces a sound wave which brings about a periodic change in the density and hence a periodic modulation of the refractive index in the solid-state crystal 18, e.g., the sound wave acts like a grating 17. Constructive interference occurs at the grating 17 at the Bragg angles $\theta_m$, for which the following applies:

$$\sin(\theta_m) = m\lambda_L/2\Lambda,$$

where $\Lambda$ denotes the grating period of the grating 17 formed by the ultrasound wave or the wavelength of the ultrasound wave, and m = ..., −2, −1, 0, +1, +2, ... denotes the order of diffraction, wherein the m=+1$^{st}$ and m=+2$^{nd}$ order of diffraction are shown in an exemplary manner in FIG. 2. The modulation frequency $f_{MOD}$ of the ultrasound wave is related to the lattice period Λ by the equation $\Lambda=c_F/f_{MOD}$, where $c_F$ denotes the speed of sound in the solid-state crystal 18. When the laser beam 7 is diffracted into the $1^{st}$ order of diffraction, the laser beam 7 experiences a Doppler frequency shift Δf, which corresponds to the excitation frequency $f_{MOD}$ of the acousto-optic modulator 13. In the shown example, the acousto-optic modulator 13 is configured to be operated at a modulation frequency $f_{MOD}$ of at least 40 MHz, preferably of at least 80 MHz.

The frequency shift Δf of the laser radiation 7 in the acousto-optic modulator 13 can be used to reduce the gain of the first pulse 11a of the laser radiation 7 in a respective optical amplifier 4a-c. FIG. 3 shows the frequency-dependent small-signal amplification 19 or the amplification profile of a respective optical amplifier 4a-c, which is normalized to one, e.g., the maximum gain $V_{MAX}$ of the optical amplifier 4a-c is $V_{MAX}=1.0$. The frequency-dependent gain 19 of the optical amplifier 4a-c, which may comprise, e.g., a laser gas ($CO_2$) as amplifier medium, has a Lorentzian profile, which assumes the maximum gain $V_{MAX}$ at a maximum frequency $f_M$, which is matched to the laser frequency $f_L$ of the laser radiation 7 to be amplified, e.g., $f_M=f_L$ applies. In FIG. 3, the maximum frequency $f_M$ is set to zero but corresponds to the laser frequency $f_L$ of the laser radiation 7 produced by the beam source 2, e.g., $f_M=21$ THz applies.

A frequency shift Δf of approximately 130 MHz in the laser frequency $f_L$ is produced by the acousto-optic modulator 13 or 13a-c, and so the laser radiation 7 enters the optical amplifier 4a-c at a shifted laser frequency and the small-signal gain in the optical amplifier 4a-c is brought about for laser radiation 7 with the shifted laser frequency $f_L'$. The laser radiation 7 with the shifted laser frequency is amplified by the optical amplifier 4a-c with a smaller gain $V_{RED}$, which lies at approximately 75% of the maximum gain $V_{MAX}$ of the optical amplifier 4a-c in the shown example. It is understood that the gain $V_{MAX}$ can also be reduced to less than approximately 70% or optionally to less than approximately 50% if the frequency shift Δf is selected to be large enough. The frequency shift Δf required to achieve the desired reduction in gain 19 depends on the amplifier bandwidth ΔB of the optical amplifier 4a-c, which lies at approximately ΔB=400 MHz in the shown example. A smaller frequency shift Δf is required to produce the desired reduced gain $V_{RED}$ in the case of a smaller amplifier bandwidth ΔB.

In the example shown in FIG. 1A, the acousto-optic modulators 13a-c are depicted as being integrated into the optical amplifiers 4a-c. However, it is understood that the acousto-optic modulators 13a-c can also be arranged in front of a respective optical amplifier 4a-c. In order to reduce the gain of the first pulse 11a in the amplifier arrangement 3 in the three optical amplifiers 4a-c, the driver laser arrangement 12 of FIG. 1A comprises a control device 14, which actuates the three acousto-optic modulators 13a-c of FIG. 1A (which can have the same design) with the same modulation frequency of 120 MHz when the beam source 2 produces the first pulse 11a. The frequency shift Δf of the three acousto-optic modulators 13a-c has the same sign, i.e., the shifted laser frequency of the laser radiation 7, which is amplified in the third acousto-optic modulator 13c, lies at $f_L+3\times\Delta f$, e.g., at approximately $f_L+360$ MHz. Accordingly, the third optical amplifier 4c has a reduced gain $V_{RED}$ for the laser radiation 7, which lies at less than approximately 35% of the maximum gain $V_{MAX}$ of the laser radiation 7.

If the beam source 2 produces the second pulse 11b, the control device 14 actuates the acousto-optic modulators 13a-c in such a way that these do not generate a sound wave, and so the grating effect is dispensed with and the laser radiation 7 passes through the acousto-optic modulators 13a-c without a frequency shift. In this way, the second pulse 11b is amplified in each one of the three optical amplifiers 4a-c with the maximum possible gain $V_{MAX}$. Since the propagation of the laser radiation 7 of the second pulse 11b is brought about along the $0^{th}$ order of diffraction, which deviates from the propagation direction of the laser radiation 7 with the $1^{st}$ order of diffraction, it may be necessary to combine the two beam paths of the $0^{th}$ order of diffraction and the $1^{st}$ order of diffraction before these are amplified in a respective optical amplifier 4a-c, e.g., by a superposition device as described below.

It is understood that, unlike what is shown in FIG. 1A, it is possible to arrange two, three or more acousto-optic modulators in the beam path upstream of the first optical amplifier 4a, to produce a frequency shift of k×Δf (k=2, 3, . . . ) upstream of the first optical amplifier 4a. Alternatively, it is also possible to use a single acousto-optic modulator 13 for producing the required frequency shift Δf if the single acousto-optic modulator 13 can be operated with a large enough modulation frequency $f_{MOD}$. However, the modulation frequency $f_{MOD}$ of an acousto-optic modulator 13 cannot be increased arbitrarily, and so it may be more advantageous to connect a plurality of acousto-optic modulators 13a-c in series to produce the desired frequency shift Δf.

One option for increasing, e.g., doubling, the frequency shift Δf of an acousto-optic modulator 13 a-c at the given modulation frequency $f_{MOD}$, includes feeding not the first, but the second or a higher order of diffraction of the acousto-optic modulator 13 to the optical amplifier or amplifiers 4a-c for amplification purposes, since the magnitude of the frequency shift Δf increases at higher orders of diffraction in the case of a given modulation frequency $f_{MOD}$.

In the shown example, the laser power of the second pulse 11b of the laser radiation 7 at the output of the amplifier arrangement 3, i.e., after the third amplifier stage 4c, lies at a factor of five and the amplification of the amplifier arrangement 3 lies at a factor of more than fifty for the second pulse 11b. Therefore, the gain of the first pulse 11a by the amplifier arrangement 3 is approximately 10% of the gain of the second pulse 11b. The power of the second pulse 11b at the output of the amplifier arrangement 3 can be, e.g., more than approximately 10 kW.

Figure 1B:
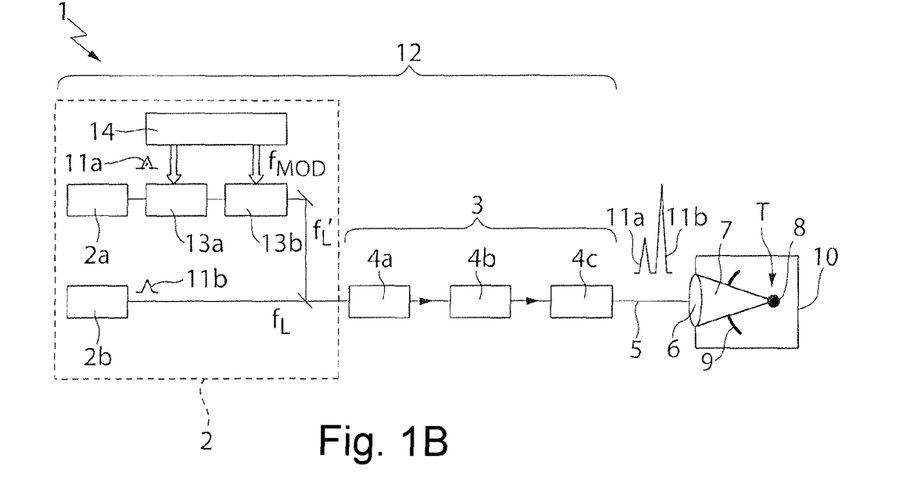

FIG. 1B shows an exemplary embodiment of the driver laser arrangement 12, in which the beam source 2 has a first laser source 2a and a second laser source 2b. The two laser sources 2a, 2b can be embodied to produce laser radiation 7 at one and the same wavelength or laser frequency or possibly at slightly different wavelengths or laser frequencies. By way of example, the first laser source 2a can serve to produce $CO_2$ laser radiation 7 at a wavelength of 10.6 μm and the second laser source 2b can serve to produce $CO_2$ laser radiation 7 at a second wavelength, e.g., between 10.1 μm and 10.35 μm, (or vice versa). The beam paths of the two laser sources 2a, 2b are combined or superposed by the amplifier arrangement 3. In some examples, a (passive) superposition device, e.g., a partly transmissive mirror, as is depicted in FIG. 1B, is used to combine or superpose the beam paths of the two laser sources 2a, 2b.

In the shown example, the first laser source 2a serves to produce the pre-pulse and the second laser source 2b serves to produce the main pulse. In the driver laser arrangement 12 shown in FIG. 1B, the laser frequency $f_L$ of the second laser source 2b corresponds to the maximum frequency $f_M$ of the optical amplifiers 4a-c and it is therefore amplified with the maximum gain $V_{MAX}$. By contrast, the laser frequency of the first laser source 2a is transformed into a shifted laser frequency with the aid of the two acousto-optic modulators 13a, 13b arranged in the beam path of the first laser source 2a by virtue of the control device 14 actuating the two acousto-optic modulators 13a, 13b with a suitable predetermined modulation frequency $f_{MOD}$.

In the case of the same power/energy of the amplified pulse 11a, the first laser source 2a produces the first pulse 11a with a higher power than would be the case without the frequency shift Δf by the two acousto-optic modulators 13a, b in the example shown in FIG. 1B. The (lower) power, with which the first pulse 11a of the first laser source 2a would be produced without the frequency shift Δf, is indicated within the first pulse 11a in FIG. 1B.

Figure 1C:
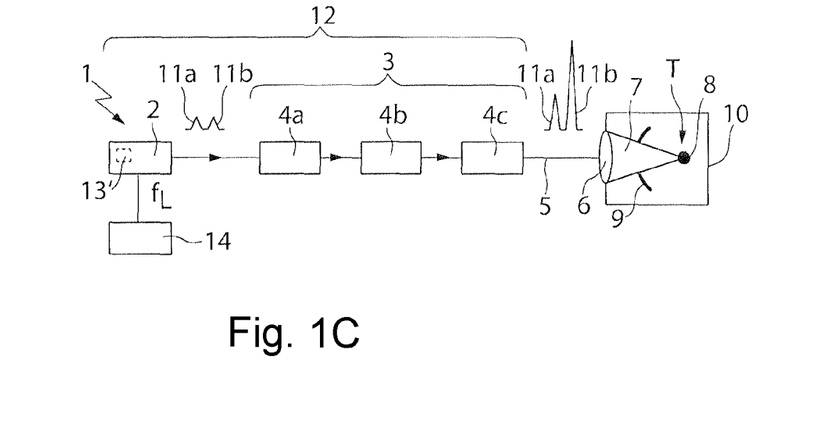

A further exemplary embodiment of a driver laser arrangement 12 or an EUV radiation production apparatus 1 is depicted in FIG. 1C. In the example shown in FIG. 1C, the beam source 2 itself is tunable, e.g., it has a frequency shifting device 13' which can be actuated by the control device 14 so as to set the laser frequency $f_L$ and—as was explained above—so as to shift said laser frequency in relation to the maximum frequency $f_M$ of the optical amplifiers 4a-c in order to reduce the gain of the first pulse 11a.

By way of example, an optically parametric oscillator, in which there is a frequency conversion of the laser radiation 7, can serve as a frequency shifting device 13' for tuning the laser wavelength $f_L$ of the beam source 2. The laser radiation 7 itself can be produced, e.g., by a solid-state laser. Alternatively, it is also possible to produce the laser radiation 7 with two different laser frequencies or laser wavelengths in the beam source 2. By way of example, a $CO_2$ laser source can serve to produce the main pulse at a laser wavelength of 10.6 μm. In order to produce the pre-pulse, there can be an excitation of a different line in the absorption spectrum of the $CO_2$ laser gas, for example, a line which has a wavelength in the range between 10.1 μm and 10.35 μm. Also—as described above—provision can possibly be made in the beam source 2 for two laser sources, which produce laser radiation 7 at different laser wavelengths, for example, a first $CO_2$ laser source, which produces laser radiation 7 at a wavelength of 10.6 μm, and a second $CO_2$ laser source which produces laser radiation 7 with a wavelength in the region, specified above, of between 10.1 μm and 10.35 μm (or vice versa). In this case, the frequency shifting device 13' can be a switching device, which brings about the excitation of different laser lines in the absorption spectrum for the purposes of producing the pre-pulse or the main pulse, or which switches between two different laser sources for the purposes of producing the pre-pulse and the main pulse. Optionally, the laser radiation of the two laser sources can also be superposed in the beam source 2 by a (passive) superposition device. In this case, the first laser source, the laser frequency of which does not correspond to the maximum frequency of the optical amplifiers 4a-c, can serve as a frequency shifting device. The beam source 2 is merely actuated by the control device 14 for the purposes of producing the pulses 11a, 11b in the desired sequence in time.

In summary, a reduction in the laser power of the pre-pulse 11a in relation to the laser power of the main pulse 11b can advantageously be performed in the manner described above. In the process, it is possible to effectively reduce, in particular, the gain of a portion of the laser radiation 7 of the pre-pulse 11a which was reflected at the target material 8 during the propagation back through the amplifier arrangement 3.

A number of embodiments of the invention have been described. Nevertheless, it will be understood that various modifications may be made without departing from the spirit and scope of the invention. Accordingly, other embodiments are within the scope of the following claims.

What is claimed is:

1. An EUV laser driver comprising:
   a beam source configured to produce pulsed laser radiation with at least one laser frequency;
   an amplifier arrangement with at least one optical amplifier amplifying the pulsed laser radiation, the at least one optical amplifier having a frequency-dependent gain with a maximum gain at a maximum frequency;
   at least one frequency shifter configured to produce a frequency shift for the laser frequency of the pulsed laser radiation relative to the maximum frequency of the at least one optical amplifier; and
   a controller configured to set the frequency shift for the at least one frequency shifter,
   wherein the pulse laser radiation having the shifted laser frequency is operable to be amplified by the at least one optical amplifier with a gain reduced to less than a specific percentage of the maximum gain of the at least one optical amplifier and then to be focused onto a target material for emitting EUV radiation.

2. The EUV laser driver of claim 1, wherein the specific percentage is 90%, 70%, or 50%.

3. The EUV laser driver of claim 1, wherein the at least one optical amplifier is configured to match the maximum frequency to the laser frequency of the pulsed laser radiation.

4. The EUV laser driver of claim 1, wherein the beam source is configured to produce a first pulse and a second pulse of the pulsed laser radiation, the second pulse following the first pulse in time, and
   wherein the controller is configured to set a first frequency shift for the at least one frequency shifter, such that the at least one frequency shifter produces the first frequency shift for the laser frequency of the first pulse and thus a first gain of the at least one optical amplifier for the first pulse is reduced to less than a first specific percentage of a first maximum gain of the at least one optical amplifier for the first pulse, and
   wherein the first and second pulses are amplified in the amplifier arrangement and focused onto the target material for emitting the EUV radiation.

5. The EUV laser driver of claim 4, wherein the first specific percentage is 90%, 70%, or 50%.

6. The EUV laser driver of claim 4, wherein, after the at least one frequency shifter, the first pulse has a frequency with the first frequency shift relative to the maximum frequency, and the second pulse has the laser frequency identical to the maximum frequency.

7. The EUV laser driver of claim 1, wherein the frequency shifter comprises at least one acousto-optic modulator.

8. The EUV laser driver of claim 7, wherein the acousto-optic modulator is configured to operate with a modulation frequency of at least 40 MHz.

9. The EUV laser driver of claim 8, wherein the modulation frequency is at least 80 MHz.

10. The EUV laser driver of claim 7, wherein the acousto-optic modulator is configured to diffract the laser radiation into at least a second order of diffraction.

11. The EUV laser driver of claim 1, wherein the beam source comprises the at least one frequency shifter arranged upstream of the at least one optical amplifier.

12. The EUV laser driver of claim 11, wherein the beam source comprises the controller coupled to the at least one frequency shifter.

13. The EUV laser driver of claim 1, wherein the amplifier arrangement comprises the at least one frequency shifter each coupled to a respective one of the at least one optical amplifier.

14. The EUV laser driver of claim 1, wherein the at least one optical amplifier has a gain with an amplifier bandwidth no less than 400 MHz for the pulsed laser radiation.

15. An EUV radiation source comprising:
an EUV laser driver including:
  a beam source configured to produce pulsed laser radiation with at least one laser frequency;
  an amplifier arrangement with at least one optical amplifier configured to amplify the pulsed laser radiation, the at least one optical amplifier having a frequency-dependent gain with a maximum gain at a maximum frequency;
  at least one frequency shifter configured to produce a frequency shift of the laser frequency of the pulsed laser radiation relative to the maximum frequency of the at least one optical amplifier; and
  a controller configured to set the frequency shift for the at least one frequency shifter, wherein the pulsed laser radiation having the shifted laser frequency is operable to be amplified by the at least one optical amplifier with a gain reduced to less than a specific percentage of the maximum gain of the at least one optical amplifier;
a vacuum chamber in which a target material is arrangeable at a target position; and
a beam guider configured to guide the amplified pulsed laser radiation from the EUV laser driver toward the target position, such that, when irradiated by the amplified pulsed laser radiation, the target material emits the EUV radiation.

16. The EUV radiation source of claim 15, further comprising:
a focusing lens configured to focus the pulsed laser radiation onto the target material at the target position; and
a collector mirror configured to focus the EUV radiation emitted from the target position.

17. The EUV radiation source of claim 16, wherein the collector mirror comprises an opening for passage of the pulsed laser radiation, and
wherein the focusing lens separates the vacuum chamber from the beam guider.

18. A method of amplifying pulsed laser radiation in an EUV laser driver, comprising:
producing, by at least one frequency shifter, a frequency shift for a laser frequency of the pulsed laser radiation relative to a maximum frequency of at least one optical amplifier, the at least one optical amplifier having a frequency-dependent gain with a maximum gain at the maximum frequency; and
amplifying, by the at least one optical amplifier, the pulsed laser radiation having the shifted laser frequency to have a gain reduced to less than a specific percentage of the maximum gain of the at least one optical amplifier, the amplified pulsed laser radiation being focused onto a target material for emitting EUV radiation.

19. The method of claim 18, wherein the specific percentage is 90%, 70%, or 50%.

20. The method of claim 18, wherein the pulsed laser radiation comprises a first pulse and a second pulse following the first pulse in time,
wherein producing a frequency shift for a laser frequency of the pulsed laser radiation comprises producing the frequency shift for the laser frequency of the first pulse,
wherein a gain of the at least one optical amplifier for the first pulse is reduced to less than the specific percentage of the maximum gain of the at least one optical amplifier, and
wherein the first and second pulses are amplified in the at least one optical amplifier and focused onto the target material for emitting the EUV radiation.

* * * * *